Feb. 28, 1939. C. R. H. BONN 2,148,897
CONTROL DEVICE FOR VALVES AND OTHER APPARATUS
Filed June 9, 1937 3 Sheets-Sheet 1

Inventor
Carl Robert Hugo Bonn
By Pennie Davis Marvin & Edmonds
Attorneys

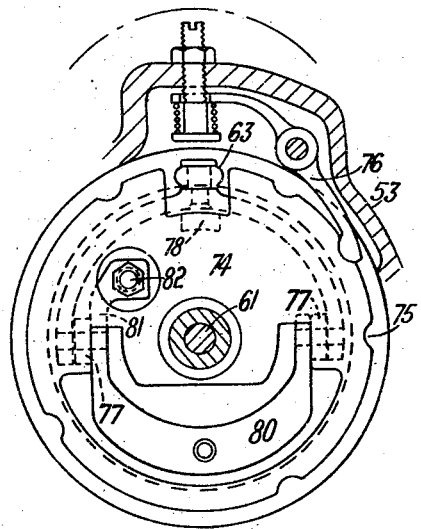

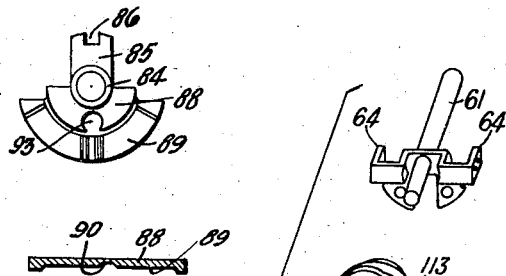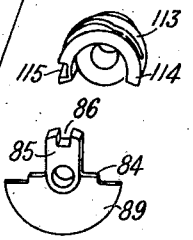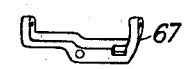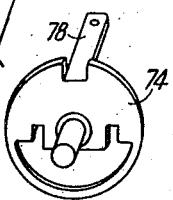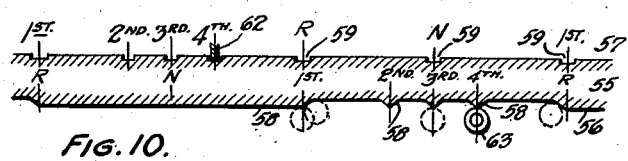

Patented Feb. 28, 1939

2,148,897

UNITED STATES PATENT OFFICE 2,148,897

CONTROL DEVICE FOR VALVES AND OTHER APPARATUS

Carl Robert Hugo Bonn, Glasgow, Scotland

Application June 9, 1937, Serial No. 147,212
In Great Britain June 13, 1936

3 Claims. (Cl. 121—40)

This invention relates to improvements in control devices for valves and other apparatus such as electric motor switches of the class adapted to be actuated by means including a control member movable from one position to another so as to effect corresponding movement of the apparatus.

Control devices for such apparatus, according to the invention, incorporate load and release devices including a control member adapted to be moved from one position to another, means for locking positively the apparatus against movement to a new position to which it tends to move under the influence of a load and means for unlocking or releasing the apparatus when said control member passes to a new position whereby the apparatus under the influence of the load follows up to the new position and is locked therein, the assembly being such that the load on the apparatus is independent of the control member and of any movement thereof whereby said control member may move freely between positions without affecting the load on the apparatus.

The invention is applicable, particularly, to the valves of the variable speed gearing described and illustrated in my United States Patent No. 2,013,126 and which control the supply of pressure fluid to the brakes of said gearing to effect a gear ratio selection.

The accompanying drawings illustrate the application of the control devices of the invention to the valves of the said variable speed gearing.

Figure 1:
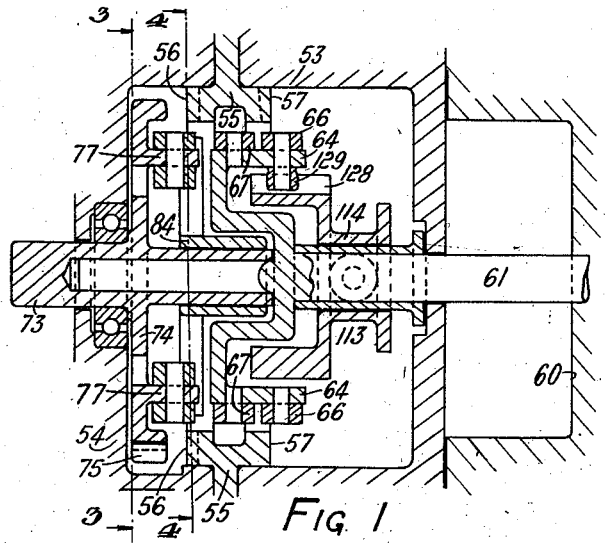
Figure 2:
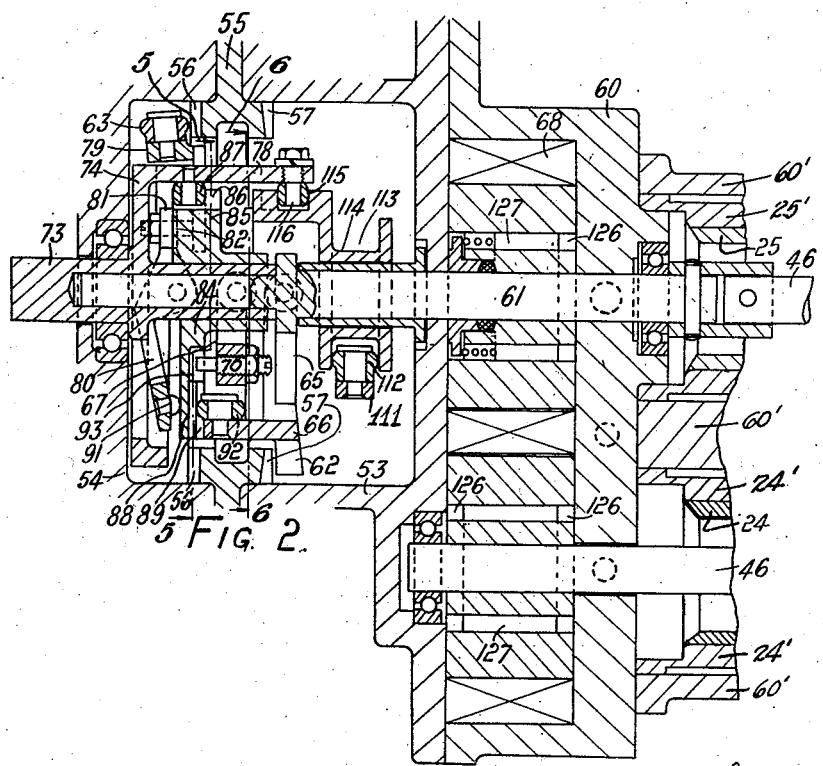

Figs. 1 and 2 of the accompanying drawings are longitudinal elevations at right angles to each other of the control devices according to an embodiment of the invention.

Figs. 3, 4, 5 and 6 are respectively sections taken respectively on the lines 3—3 and 4—4 of Fig. 1 and lines 5—5 and 6—6 of Fig. 2.

Figs. 7, 8 and 9 are respectively fragmentary sections taken respectively on the lines 7—7, 8—8 and 9—9 of Fig. 5 of details illustrated by Figs. 1 to 6.

Fig. 10 is a diagram illustrating the development of a cam and locking ring hereinafter referred to.

Fig. 11 is an end view of a detail of the mechanism which will be hereinafter referred to. Fig. 12 is a section of a portion of the detail illustrated by Fig. 11 and illustrates a cam development. Fig. 13 is an exploded view illustrating in perspective views, details of the mechanism hereinafter referred to. Fig. 14 is a diagrammatic side view of a motor for loading the apparatus hereinafter referred to.

As shown by Fig. 2 the spindles 46 of the inlet and exhaust valves 24 and 25 of the variable speed gearing to which the invention is applicable and which constitutes the apparatus to be controlled are geared together by gear wheels 68 enclosed within a casing 60 and constituting a pressure fluid motor (Fig. 14). Desirably and as shown, one of the gear wheels 68 is secured on a spindle 61 coupled to the spindle of the exhaust valve 25 and the other gear wheel 68 is secured on the spindle of the inlet valve 24.

In an assembly in which one valve only is provided one or other of the gear wheels is secured on the spindle of said valve.

Desirably the side faces of the gear wheels 68 are provided with annular grooves 126 connected by passages 127 so as to balance the pressure on both sides of the gear wheels and prevent axial thrust.

Pressure fluid admitted to the casing 60 through the pipe 104 and discharged through the pipe 105 effects rotation of the gear wheels 68 in the direction indicated by the arrow 62. Pressure fluid admitted through the pipe 105 and discharged through the pipe 104 effects rotation of the gear wheels in the opposite direction.

It will be observed that the motor 68 transmits a load to the valve spindles 46 which tends to rotate said spindles in one direction or the other.

The valves 24, 25, end fragmentary portions only, of which are shown by Fig. 2, consist of tubes formed with ports which, on rotation of the tubes, register with corresponding ports formed in the respective sleeves 24', 25' secured within the casing 60'. When the valves 24, 25 are in one position, hereinafter termed 1st, certain ports of the valves are in register with corresponding ports in the associated sleeves 24', 25' and the variable speed gearing controlled by said valves is in 1st speed. Rotation of the valves 24, 25 effects registration of other corresponding ports of the valves and sleeves whereby the variable speed gearing is in either 2nd (second speed), 3rd (third speed), 4th (fourth speed), N (neutral), or R (reverse) as the case may be.

The setting of valve ports do not form part of this invention, the valve assembly being merely the apparatus to be controlled which is movable through a series of positions.

The control devices (Figs. 1 to 10) are enclosed within a casing 53 between which and the cover plate 54 thereof there is interposed a ring member 55, the side faces of which present respectively a cam face 56 and a locking face 57. The cam face 56, Fig. 10, presents projections 58 and the locking face 57 presents notches 59, said projections and notches being spaced to correspond to the various valve port positions or speeds of the epicyclic gearing assembly.

According to the embodiment illustrated by Fig. 10, the notches 59 marked 1st, 2nd, 3rd, 4th, N and R of the locking face 57 correspond respectively to the positions of the aparatus to be controlled, that is, to the first speed, second speed, third speed, top or fourth speed, neutral and reverse positions of the gears of the variable speed gearing.

A locking pin or tooth 62 is indicated in the 4th speed notch, the valves being in the top gear position.

The projections 58 of the cam face 56 marked 1st, 2nd, 3rd, 4th, N and R correspond respectively to the positions of the apparatus to be controlled, that is, to the first speed, second speed, third speed, top or fourth speed, neutral and reverse positions of the gears of the variable speed gearing.

A runner 63 which tracks the cam face 56 is shown opposite the 4th speed projection, the valves being in top speed position.

The projections 58 are spaced 180° angularly from the locking notches 59.

The spindle 61 is formed with a bracket presenting two pairs of lugs 64 and 65 respectively. The pair of lugs 64 are spaced laterally one on each side of the spindle 61 and extend parallel to said spindle 61. The other pair of lugs 65 are spaced apart angularly and extend radially to the spindle 61. Spring-urged hanging members 66 and 67 respectively are pivoted suspended from the lugs 64. The member 66 is provided with the tooth or key 62 which engages the notches 59 of the locking face 57. The member 67 carries a "pick-up" pin 70 hereinafter referred to. A spring 71 interposed between the member 66 and one of the lugs 65 urges the tooth 62 into engagement with the corresponding notch 59 and a spring 72 is interposed between the member 67 and the other lug 65.

It will be observed that when the tooth 62 is engaged in one of the notches 59 of the locking face 57 the spindle 61 and therefore the valve spindles 46 are held against rotation, that is, against the load or force exerted by the motor 68 which tends to rotate the spindle 61.

The control member which may be constituted by a handle or a pinion is secured on a sleeve 73 mounted for rotation on the spindle 61 and formed integrally with a disc 74, the rim of which is provided with a plurality of notches 75 spaced angularly and constituting stations corresponding to the various speed positions. A spring-urged detent 76 is adapted to engage in one or other of the notches 75. The disc 74 is provided with a pair of lugs 77 spaced laterally, one on each side of the sleeve 73 and parallel thereto. The disc is also provided with a flange 78 which is located angularly intermediate the lugs 77 and extends parallel to the sleeve 73. A bridge member 79 pivoted to the lugs 77 carries the runner 63 which tracks the cam face 56. A hanging member 80 pivotally suspended to the lugs 77 is formed with an extension 81 which carries a pin 82 adapted to press against a flange 83 presented by the bridge member 79. A sleeve 84 axially slidable on the sleeve 73 is illustrated in detail by Figs. 11 and 12. The sleeve 84 presents a radial flange 85 provided with a rim groove or slot 86 in which is located a runner 87 carried by the flange 78 of the disc 74. The sleeve 84 presents also a radial flange 88 which, on one side, is formed with a recess 93 and with a cam surface 89 which includes a recess 90. The spring 72 urges the "pick-up" pin 70 into engagement with the recess 93. The cam surface 89 is adapted to be tracked by a runner 92 carried by the spring-urged hanging member 66. The other side of the flange 88 is adapted to be engaged by a pin 91 carried by the hanging member 80.

When the inlet and exhaust valves 24 and 25 are in register for a speed position constituting a station, say the 4th or top speed, the runner 63 is at the apex of the cam projection 58 marked 4th, the tooth 62 is in engagement with the locking notch 59 marked 4th, the runner 92 is in the recess 90, the pick-up pin 70 is in the recess 93 and the detent 76 is in engagement with the notch 75 which corresponds to the 4th speed position.

Angular movement of the control handle or rotary motion imparted to the control pinion effects angular movement of the disc 74 and therefore of the bridge member 79 and hanging member 80 carried thereby and also, by means of the runner 87 and groove 86, of the sleeve 84. Immediately the runner 63 leaves the apex of the co-operative cam projection 58 the bridge member 79 rocks on its pivot and thereby rocks the hanging member 80 so that the pin 91 moves away from the flange 88 of the axially slidable sleeve 84.

The angular movement of the flange 88 causes the inclined end face of the notch 90 to mount the runner 92 and effect axial sliding movement of the flange 88 to follow the pin 91. The runner 92, which is locked by engagement of the tooth 62 in the locking notch 59, tracks the cam surface 89. The axial movement of the flange 88 disengages the recess 93 from the pick-up pin 70 which under the influence of the spring 72 tracks the surface of the flange 88 and applies a drag to the angular movement of said flange.

A stop 70' presented by the bracket constituted by the lugs 64, 65, is provided to limit the forward movement of the pin 70 under the influence of the spring 72.

When the runner 63 reaches the next speed position the 3rd speed position, the bridge member 79 and hanging member 80 are rocked whereby the pin 91 slides the flange 88 and sleeve 84 axially. The cam surface 89 by pressing on the runner 92 swings the member 66 against the force exerted by the spring 71 and thereby moves the tooth 62 out of engagement with the notch 59. Immediately the tooth 62 is clear of the notch 59 the spindle 61 is released and therefore the hanging members 66 and 67 are rotated by the motor 68 until the runner 92 registers with the recess 90 and the pick-up pin 70 registers with the recess 93.

The motor 68 is included in a pressure fluid circuit provided with a valve adapted to control the direction of rotation of the motor, the direction of rotation of the motor being reversed to effect a change in the direction of rotation of the rotary valves which control the supply of pressure fluid to the brakes of the variable speed gearing assembly whereby the speed of said assembly may be changed either up or down.

The control valve included in the pressure fluid circuit may be operated by means including an axially slidable and rotatable sleeve 114 provided with a groove 113 in which operates a runner 112 carried by a lever 111 operatively connected to the said control valve. The sleeve 114 is also provided with grooves 115 and 128. A runner 116 carried by the flange 78 of the disc 74 tracks the groove 115 and a runner 129 carried by one of the lugs 64 tracks the groove 128.

The said control valve and the devices for operating said valve are not included as part of the load and release devices of this invention.

In the application of the control devices of the invention to electric motor switches the spindles 46 may be provided with contacts adapted on rotation of the spindles to track successively spaced stationary contacts.

I claim:—

1. Control devices for valves and other apparatus movable through a series of positions, comprising in combination, loading means which normally urges said apparatus to the next position of the series, a cam face, a plurality of projections spaced apart to correspond to the several positions of said apparatus and presented by said cam face, a runner, control means for causing said runner to track said cam face, a locking face formed with a plurality of notches spaced apart to correspond to the several positions of said apparatus, a locking tooth cooperative with said notches and means operatively connecting said runner and locking tooth.

2. Control devices for valves and other apparatus movable through a series of positions, comprising in combination, loading means which normally urges said apparatus to the next position of the series, a ring member, a plurality of spaced projections on one side face of said ring member, a plurality of spaced notches in the other side face of said member, a runner cooperative with said projections, a locking tooth cooperative with said notches and means operatively connecting said runner and locking tooth to effect movement of said tooth out of engagement with a notch when said runner passes over a projection.

3. Control devices for valves and other apparatus movable through a series of positions, comprising in combination, loading means which normally urges said apparatus to the next position of the series, a disc movable angularly by a control member, a bridge member pivotally carried by said disc, a runner carried by said bridge member, a ring member, a plurality of spaced projections on one side face of said ring member, a plurality of spaced notches on the other side face of said ring member, a hanging member pivotally suspended from said disc, an axially movable and rotatable sleeve operatively connected to said disc, a flange presented by said sleeve and cooperative with said hanging member, a spindle presented by the apparatus to be controlled, two spring-urged hanging members carried by said spindle, a recess formed in said flange, a cam surface presented by said flange, a pick-up-pin carried by one of said spring-urged hanging members and cooperative with said recess, a runner for tracking said cam surface and a locking tooth cooperative with aforesaid notches, both runner and locking-tooth being carried by the other of said spring-urged hanging members.

CARL ROBERT HUGO BONN.